United States Patent
Hashizume et al.

(10) Patent No.: US 8,445,807 B2
(45) Date of Patent: May 21, 2013

(54) ELECTRODE WIRE FOR WIRE ELECTRICAL DISCHARGE MACHINING, METHOD FOR MANUFACTURING THE SAME, AND METHOD FOR ELECTRICAL DISCHARGE MACHINING USING THE SAME

(75) Inventors: Koichi Hashizume, Kawasaki (JP); Masakazu Yoshimoto, Kawasaki (JP); Nobuyuki Washio, Kawasaki (JP); Yoichiro Kimoto, Kawasaki (JP); Hiroshi Sato, Kawasaki (JP); Isao Izui, Kawasaki (JP)

(73) Assignee: Oki Electric Cable Co,. Ltd., Kanagawa (JP)

( * ) Notice: Subject to any disclaimer, the term of this patent is extended or adjusted under 35 U.S.C. 154(b) by 0 days.

(21) Appl. No.: 13/233,303

(22) Filed: Sep. 15, 2011

(65) Prior Publication Data
US 2012/0000889 A1 Jan. 5, 2012

(30) Foreign Application Priority Data

Feb. 2, 2010 (JP) .................................. 2010-020826
Aug. 4, 2010 (JP) .................................. 2010-175130

(51) Int. Cl.
*B23H 7/08* (2006.01)
*B23H 1/04* (2006.01)
*B23H 1/06* (2006.01)

(52) U.S. Cl.
USPC ....................................... 219/69.12; 428/674

(58) Field of Classification Search
USPC ............ 219/69.12, 69.15; 72/47, 286; 427/60, 427/61, 356, 357, 433; 428/615, 618, 674, 428/687, 939; 148/679
See application file for complete search history.

(56) References Cited

U.S. PATENT DOCUMENTS

| 2001/0014411 A1* | 8/2001 | Seong ........................ 219/69.12 |
| 2006/0138091 A1* | 6/2006 | Lee ............................ 219/69.12 |
| 2006/0219666 A1* | 10/2006 | Shin ........................... 219/69.12 |
| 2009/0025959 A1* | 1/2009 | Tomalin ..................... 174/126.2 |
| 2010/0163529 A1* | 7/2010 | Sato et al. ................... 219/69.15 |

FOREIGN PATENT DOCUMENTS

| JP | 9-300136 A | 11/1997 |
| JP | 2004-160655 A | 6/2004 |
| JP | 2005-96060 A | 4/2005 |
| JP | 2005-230992 A | 9/2005 |
| JP | 3718617 B2 | 11/2005 |
| JP | 2008-183704 A | 8/2008 |
| JP | 2008-535668 A | 9/2008 |
| JP | 2008-296298 A | 12/2008 |
| JP | 2008-296298 A * | 12/2008 |
| WO | WO 2009/028117 A1 | 3/2009 |

OTHER PUBLICATIONS

Machine translation of Japan Patent document No. 2008-296,298, Sep. 2012.*

* cited by examiner

*Primary Examiner* — Geoffrey S Evans
(74) *Attorney, Agent, or Firm* — Dickstein Shapiro LLP

(57) ABSTRACT

A wire material having a copper-zinc alloy layer, which is formed by action of thermal diffusion, and a zinc layer on its circumference surface is subjected to processes, including from a step of drawing the wire material to a step of reducing the diameter of the product, to reliably crash the copper-zinc alloy layer into particles. The particles are embedded in the circumference surface of a core to integrate the diffusion alloy layer and zinc layer with the core and prevent the diffusion alloy layer and zinc layer from falling off from the core. In addition, in order to cover cracks formed in the copper-zinc alloy layer during wire drawing with a zinc thin film, wire drawing is performed at temperatures appropriate for maintaining good malleability and ductility of zinc.

17 Claims, 16 Drawing Sheets

— streak

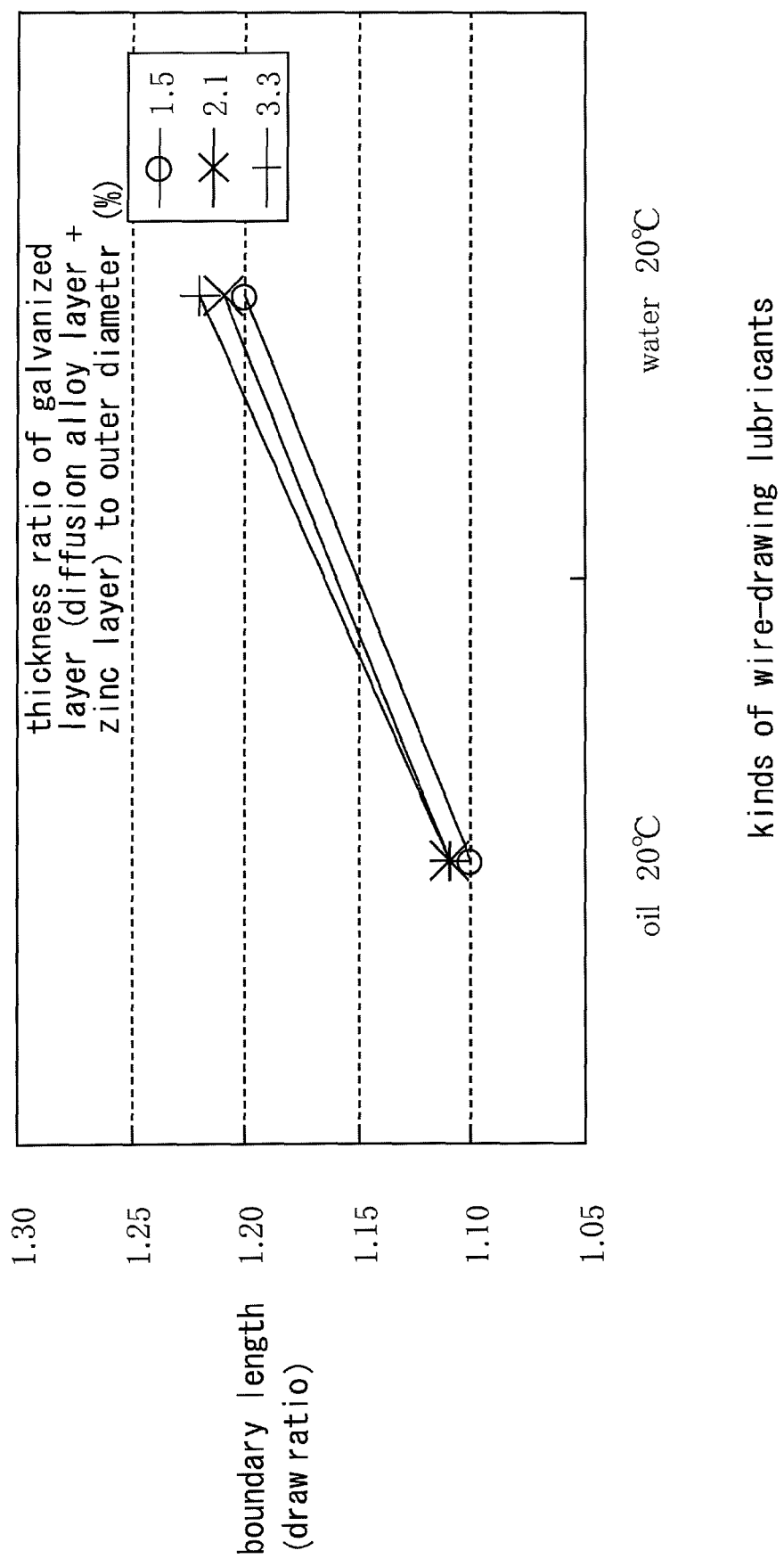

ELECTRODE WIRE FOR WIRE ELECTRICAL DISCHARGE MACHINING, METHOD FOR MANUFACTURING THE SAME, AND METHOD FOR ELECTRICAL DISCHARGE MACHINING USING THE SAME

CROSS REFERENCE TO RELATED APPLICATION

This application is a continuation of International application No. PCT/JP2011/050072, filed Jan. 6, 2011, the contents of which are incorporated herein by reference.

The present application is based on and claims priority of Japanese patent application No. 2010-020826 filed on Feb. 2, 2010, and Japanese patent application No. 2010-175130 filed on Aug. 4, 2010, the entire contents of which are hereby incorporated by reference.

BACKGROUND OF THE INVENTION

1. Field of the Invention

The present invention relates to an electrode wire for wire electrical discharge machining that machines a workpiece (an object being machined) with electrical discharges and a method for manufacturing the electrode wire and a method for electrical discharge machining with the electrode wire.

2. Description of the Related Art

The wire electrical discharge machining is used to cut a workpiece by means of heat energy produced by electrical discharges created between an electrode wire for electrical discharge machining and the workpiece, and is particularly suitable for metalworking for producing metal molds or other intricate-shaped metal items.

Electrical discharge machining needs to meet certain requirements, for example, a) high machining speed; b) excellent surface finish and accurate dimension of a workpiece; c) high positioning accuracy for determining the position of the electrode wire relative to the workpiece; and d) low metal debris production caused by the continuously running electrode wire.

A widely-used conventional electrode wire is a solid brass electrode wire with a zinc concentration of 35 to 40 weight %. If the content of zinc is increased to 40 weight % or higher, the solid brass electrode wire produces an intermetallic compound with a body-centered cubic lattice that deteriorates malleability, ductility and toughness of the wire. Such a solid brass electrode wire cannot be subjected to cold drawing and therefore is impossible to be manufactured.

Various research on solid brass electrode wires for making the electrical discharge machining speed higher than the solid brass electrode wire with a zinc concentration of 35 to 40 weight % frequently suggests that the electrical discharge machining speed can be accelerated with an increase in zinc concentration in the composition of the electrode wire.

As a method for increasing the zinc concentration, it is known to provide a copper-zinc alloy layer with a zinc concentration of 40 weight % or higher on the surface of an electrode wire, and optionally add a zinc layer on the copper-zinc alloy layer.

Japanese Patent No. 3718617 (Patent Document 1) discloses a porous electrode wire provided on its surface with a copper-zinc alloy layer with a zinc concentration of at least 40 weight % and optionally provided with a zinc layer on the copper-zinc alloy layer.

The porous electrode wire is made of a copper bearing core, a copper-zinc alloy layer on the surface of the core, and optionally a zinc layer on the copper-zinc alloy layer, those layers being provided through hot-dip galvanizing, and is drawn to intentionally crack its surface to increase the surface area of the electrode wire. The increased surface area increases the contact area between the wire and machining liquid during electrical discharging, thereby further accelerating the cooling speed and accordingly enhancing the machining speed.

In addition, International Publication No. WO 2009/028117 (Patent Document 2) discloses an electrode wire having the following configurations for the purpose of addressing the problem of the above invention.

The electrode wire includes an inner copper-zinc alloy layer (a zinc concentration of 50 to 80 weight %) formed by thermal diffusion of molten zinc into a core made of copper or copper alloy and an outer copper-zinc alloy layer (a zinc concentration of 81 to 100 weight %) formed by diffusion of copper of the core into the molten zinc (three-layer structure including the two copper-zinc alloy layers, the outer layer of which being formed by diffusion, and a zinc layer provided thereon).

The zinc layer is thicker than the diffusion alloy layer.

The thickness of the zinc layer constitutes at least 1.2% of the outer diameter, and no cracks are present on the outermost layer of the electrode wire.

It is possible to improve the machining speed with the conventional high-speed machining electrode wires formed by providing a zinc layer and a diffusion alloy layer on the circumference surface of a core made of copper or copper alloy and drawing it, but the wires deteriorate the other properties required for electrical discharge machining.

Forming cracks in the surface layer of an electrode wire is a well-known technique; however, the cracks formed in the surface layer of the electrode wire cause the following problems:

a. Since wire electrical discharge machining is to cut a workpiece, like a jig saw, by producing discharges between an electrode wire and workpiece, cracks in the surface layer of the electrode wire destabilize the electrical discharges, resulting in poor surface finish of the workpiece;

b. Wire electrical discharge machining apparatuses recognize the relative position between the workpiece and electrode wire by utilizing the electrical conductivity between the workpiece and electrode wire. The presence of the cracks in the surface layer of the electrode wire reduces the contact area and therefore deteriorates the positioning accuracy;

c. Such a brittle surface as is cracked when cold drawn produces a large amount of metal debris due to friction and chafing between the electrode wire and a guide, pulley and some other parts of a machining apparatus that continuously runs the electrode wire for electric discharge machining; and d. The cracks in the surface layer decrease reliability of the electrode wire because the wire is likely to break during handling or machining.

Well-known measures are taken to prevent cracks from generating in the outermost layer of an electrode wire with a diffusion alloy layer. This electrode wire is designed to include a zinc layer having a thickness constituting 1.2% or more of the outer diameter of the wire to cover the cracks in the diffusion alloy layer, and therefore the outermost layer, which is the zinc layer, needs to be thick to provide the outermost layer without cracks. However, such a thick zinc layer wears out due to evaporation of zinc and becomes small in diameter during electric discharge machining as shown in FIG. 4, thereby making a difference in width of a machined groove between an inlet side and outlet side and consequently tapering the surface being machined, which is a problem in machining accuracy.

In addition, the thick zinc layer and diffusion alloy layer are likely to peel off from the core after being subjected to a wire drawing process to obtain an electrode wire having a desired diameter of approximately 0.1 to 0.3 mmφ.

If the electrode wire with such an easy-to-peel diffusion alloy layer and zinc layer is used to perform electrical discharge machining, peeled pieces form a bridge between the electrode wire and workpiece and the bridge brings about shorts. Deceleration of machining-speed due to reduction of the number of electrical charges and unstable electrical discharges produce dense collections of craters appearing as fine streaks on the machined surface along the travelling direction of the electrode wire as shown in a schematic diagram of FIG. 5.

SUMMARY OF THE INVENTION

The present invention has been made to address these problems and has an object to provide an electrode wire for high-speed electrical discharge machining, the wire being capable of preventing machining accuracy degradation caused by wear of zinc, deceleration of the machining speed caused by shorts, and fine streak formation on the machined surface along the traveling direction of the electrode wire.

The present invention has another object to provide an electrode wire for electrical discharge machining, the wire producing a lesser amount of metal debris derived from the continuously running electrode wire, providing an excellent positioning capability to measure the relative positions between the electrode wire and workpiece, and being unbreakable during handling or machining.

In addition, the present invention has another object to provide a method for manufacturing the electrode wire for electrical discharge machining and a method for electrical discharge machining using the electrode wire.

An electrode wire for wire electrical discharge machining according to the present invention is made by drawing a base wire including a hot-dip galvanized layer formed on a circumference surface of a core made of copper or copper alloy and a diffusion alloy layer generated by thermal interdiffusion between the hot-dip galvanized layer and the core. The hot-dip galvanized layer is drawn based on the difference in malleability and ductility between the hot-dip galvanized layer and the diffusion alloy layer to become a zinc thin film without cracks, and the diffusion alloy layer is crashed by wire drawing into particles to be embedded in the circumference surface of the core such that the zinc thin film and the diffusion alloy layer are integrated with the core and do not fall from the core.

As to the electrode wire for wire electrical discharge machining according to the present invention, the zinc thin film without cracks is formed through wire drawing at a temperature within a range in which the zinc can maintain its good malleability and ductility under the influence of heat generated during wire drawing.

As to the electrode wire for wire electrical discharge machining according to the present invention, the particles of the crashed diffusion alloy layer are deeply embedded in the circumference surface of the core by receiving a large interface pressure in the vertical direction.

In addition, as to the electrode wire for wire electrical discharge machining according to the present invention, the particles of the crashed diffusion layer are deeply embedded in the core through wire drawing at a high wire-drawing rate obtained by subtracting a cross-sectional area after the wire drawing from a cross-sectional area before the wire drawing to obtain a reduced cross-sectional area, dividing the reduced cross-sectional area by the cross-sectional area before the wire drawing and multiplying the result by 100.

A method for manufacturing an electrode wire for wire electrical discharge machining includes preparing a galvanized base wire to be the electrode wire by passing a core made of copper or copper alloy through a plating bath containing zinc at a predetermined temperature for a dipping time to form a zinc layer having a thickness exceeding a predetermined thickness as an outermost layer of the core and to form a diffusion alloy layer through thermal interdiffusion occurring at an interface where the core and the zinc are in contact, and cooling the core with the zinc layer and diffusion alloy layer; and drawing the galvanized base wire. The galvanized base wire is subjected to wire drawing at a temperature within a range in which the zinc can maintain its good malleability and ductility to form a zinc thin film without cracks.

In the method for manufacturing an electrode wire for wire electrical discharge machining according to the present invention, in order to draw the galvanized base wire at a temperature within a range in which the zinc can maintain its good malleability and ductility, the temperature in a circulating reservoir of a wire-drawing lubricant that circulates to be supplied to the interface between dies and a wire material is controllably maintained at 75° C. to 100° C.

A method for manufacturing an electrode wire for wire electrical discharge machining according to the present invention includes: preparing a galvanized base wire to be the electrode wire by passing a core made of copper or copper alloy through a plating bath containing zinc at a predetermined temperature for a dipping time to form a zinc layer having a thickness exceeding a predetermined thickness as an outermost layer of the core and to form a diffusion alloy layer through thermal interdiffusion occurring at an interface where the core and the zinc are in contact, and cooling the core with the zinc layer and diffusion alloy layer; and drawing the galvanized base wire. The diffusion alloy layer is crashed into particles and embedded in the circumference surface of the core to integrate the zinc thin film and diffusion alloy layer with the core and prevent the thin film from separating from the core.

In the method for manufacturing an electrode wire for wire electrical discharge machining according to the present invention, water is used as the wire-drawing lubricant to increase a friction coefficient between the dies and the wire material and to generate a large interface pressure in the vertical direction at an interface between the dies and the wire material, and the pressure reliably crashes the diffusion alloy layer into particles that are then deeply embedded in the circumference surface of the core.

In the method for manufacturing an electrode wire for wire electrical discharge machining according to the present invention, the diffusion alloy layer is reliably crashed into particles by controlled wire drawing performed at a wire-drawing rate not lower than a predetermined wire-drawing rate to deeply embed the particles in the circumference surface of the core, and the wire-drawing rate is obtained by subtracting a cross-sectional area after wire drawing from a cross-sectional area before wire drawing to obtain a reduced cross-sectional area, dividing the reduced cross-sectional area by the cross-sectional area before wire drawing and multiplying the result by 100.

In the method for manufacturing an electrode wire for wire electrical discharge machining according to the present invention, the predetermined wire-drawing rate is 94.0% or higher.

An electrode wire for wire electrical discharge machining according to the present invention includes a hot-dip galvanized layer formed on a circumference surface of a core made of copper or copper alloy and a thermal diffusion alloy layer generated between the hot-dip galvanized layer and the core. The thermal diffusion alloy layer is a layer made of a dense collection of crashed particles that integrate the core and the hot-dip galvanized layer and prevent the layer from separating from the core.

As to the electrode wire for wire electrical discharge machining according to the present invention, a boundary length between the particles of the crashed thermal diffusion alloy layer and the core is at least 1.20 times longer than the length of the same electrode wire having the boundary length.

A method for manufacturing an electrode wire for wire electrical discharge machining according to the present invention includes: preparing a galvanized base wire to be the electrode wire by hot-dip galvanizing copper or copper alloy to produce thermal interdiffusion between the core and the hot-dip galvanized layer to form a diffusion alloy layer; and drawing the galvanized base wire. A boundary length between particles obtained by crashing the diffusion alloy and the core after wire drawing is at least 1.20 times longer than the length of the same electrode wire having the boundary length.

In a method for electrical discharge machining using an electrode wire for wire electrical discharge machining, the electrode wire includes a hot-dip galvanized layer formed on a circumference surface of a core made of copper or copper alloy and a thermal diffusion alloy layer formed between the core and the hot-dip galvanized layer. The thermal diffusion alloy layer is a layer made of a dense collection of crashed particles that integrate the core and the hot-dip galvanized layer and prevent the layer from separating from the core.

BRIEF DESCRIPTION OF THE DRAWINGS

FIG. 10 includes photocopies of particles of the diffusion alloy layers embedded in cores (digital microscope, at 1,000-fold magnification)

FIG. 12 includes photocopies of streaks formed in the travelling direction of the electrode wire (digital microscope, at 40-fold magnification)

FIG. 14 includes photocopies of particles of the diffusion alloy layer embedded in the core (digital microscope, at 1000-fold magnification)

FIG. 17 illustrates the relationship between the kinds of lubricants and the boundary length between the particles of the diffusion alloy layer and the core.

BEST MODE FOR CARRYING OUT THE INVENTION

Figure 1:
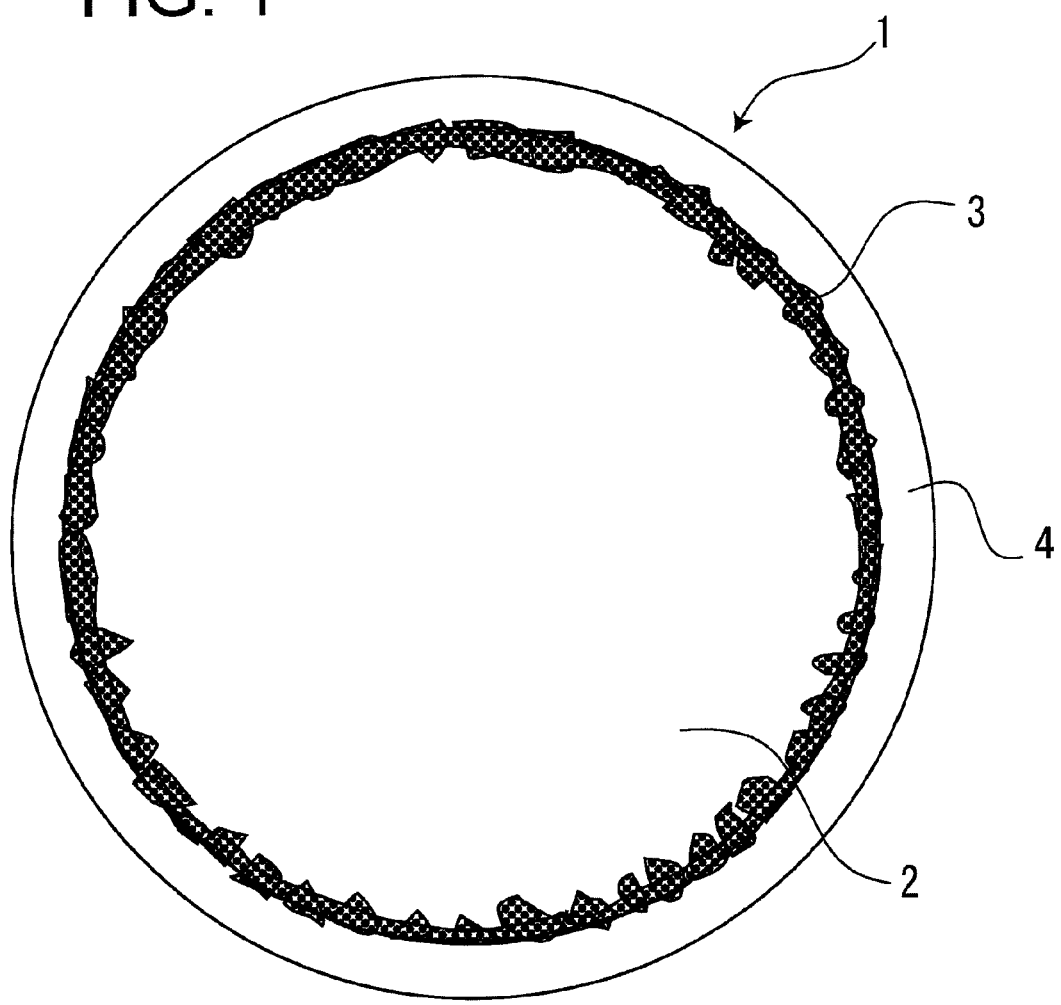
FIG. 1 is a cross-sectional view of an electrode wire of the present invention.

The electrode wire for wire electrical discharge machining according to the present invention has been made to address the aforementioned problems underlying conventional electrode wires each having a diffusion alloy layer on its circumference surface and a zinc layer thereon.

A conventional electrical-discharge-machining electrode wire with a diffusion alloy layer can be obtained through a method including: forming an outer metal layer of zinc on the circumference surface of a core made of copper or copper alloy through electro-galvanizing or hot-dip galvanizing to make a wire material; forming a diffusion alloy layer by heating the wire material so as to cause thermal interdiffusion between the galvanized layer and core; and drawing the wire material including the diffusion alloy layer to reduce the cross-sectional area thereof.

A problem with the conventional electrode wire is that the diffusion alloy layer is a copper-zinc diffusion alloy layer, which is an intermetallic compound with a body-centered cubic lattice, having a zinc concentration of 40% or higher. Such a diffusion alloy layer is rigid and brittle and therefore breaks during a wire-drawing process because of the difference in deformation characteristics between the core and diffusion alloy layer and leaves cracks in the surface of the electrode wire. The debris of the broken diffusion alloy layer falls off from the core and causes a short between the workpiece and electrode wire, resulting in reduction of the machining speed and quality degradation of the machined surface.

Through considerable research to achieve an electrode wire with an improved diffusion alloy layer, the applicant found that the following three approaches integrate the core and galvanized layer with the thermal diffusion alloy layer to prevent exfoliation and obtain an electrode wire without surface cracking in an economical way.

1. A galvanized base wire is subjected to wire drawing with the temperature of zinc maintained at 100° C. to 150° C., which is a good temperature range for zinc's malleability and ductility for the purpose of making it possible for even a thin zinc layer of the galvanized base wire to cover cracks in the diffusion alloy layer to prevent the cracks from appearing on the outermost surface of the electrode wire.

2. Water is used as a wire-drawing lubricant because water generates more friction resistance than oil-based wire-drawing lubricants generally used in wire drawing. With an increase in the friction resistance between wire drawing dies and a galvanized base wire, a large interface pressure is vertically generated at an interface between walls of the dies and the base wire and reliably crashes the diffusion alloy layer into particles for the purpose of deeply embedding the particles, like a wedge, in the circumference surface of the core.

3. Wire drawing is performed at a high rate of wire drawing by extending the time required to embed the diffusion alloy layer in the core and increasing the number of passes in which the diffusion alloy layer passes through the dies to reliably crash the diffusion alloy layer into particles for the purpose of deeply embedding the particles in the circumference surface of the core.

As to Approach 1, Patent Document 2 describes that the thickness of the zinc layer needs to be 1.2% or more of the outer diameter of the electrode wire to prevent the surface of the electrode wire from cracking during wire drawing. However, the thick zinc layer deteriorates machining accuracy due to evaporation and wearing of zinc and is likely to fall off during wire drawing.

The present invention address the problem by performing wire drawing at temperatures suitable for zinc's malleability and ductility to prevent cracks from appearing on the surface of the electrode wire even if the zinc layer is a thin film.

Zinc is brittle in room temperature, but enhances its malleability and ductility at temperatures from 100° C. to 150° C. With the properties, maintaining the temperature of the wire-drawing lubricant from 75° C. to 100° C. to draw the galvanized base wire with the zinc layer at 100° C. to 150° C. in anticipation of a temperature rise caused by friction heat between the galvanized base wire and the walls of the wire-drawing dies, allows the zinc layer to completely cover the cracks of the diffusion alloy layer, thereby preventing the cracks from appearing on the outermost surface of the electrode wire.

Approach 2 uses water, which generates friction resistance more than oil-based wire-drawing lubricants, as a wire-drawing lubricant, to crash the diffusion alloy layer during wire drawing and then to deeply embed the particles of the diffusion alloy layer in the core made of copper or copper alloy. Consequently, Approach 2 integrates the zinc thin film and thermal diffusion alloy layer with the core and prevents exfoliation.

Since the diffusion alloy layer is an intermetallic compound with a body-centered cubic lattice, the diffusion alloy layer does not have malleability and ductility and is likely to break into particles during wire drawing and fall off with the zinc layer from the core. The exfoliation of the zinc layer and diffusion alloy layer during electrical discharge machining causes a short between the electrode wire and workpiece, which leads to reduction of the machining speed due to decrease in the number of electrical discharges and formation of fine streaks on the machined surface in the travelling direction of the electrode wire due to unstable electric discharging.

In the present invention, the particles of the diffusion alloy layer are embedded deeply in the core such that the boundary length between the particles of the crashed diffusion alloy layer and core is 1.20 times longer than the length of the same electrode wire having the boundary length, thereby integrating the zinc thin film and diffusion alloy layer with the core. Accordingly, the present invention is directed to an electrode wire for wire electrical discharge machining configured to prevent the zinc thin film and diffusion alloy layer from falling off from the core and a method for manufacturing the electrode wire, and a method for electrical discharge machining using the electrode wire.

The integration is achieved on the following principles.

Figure 6:
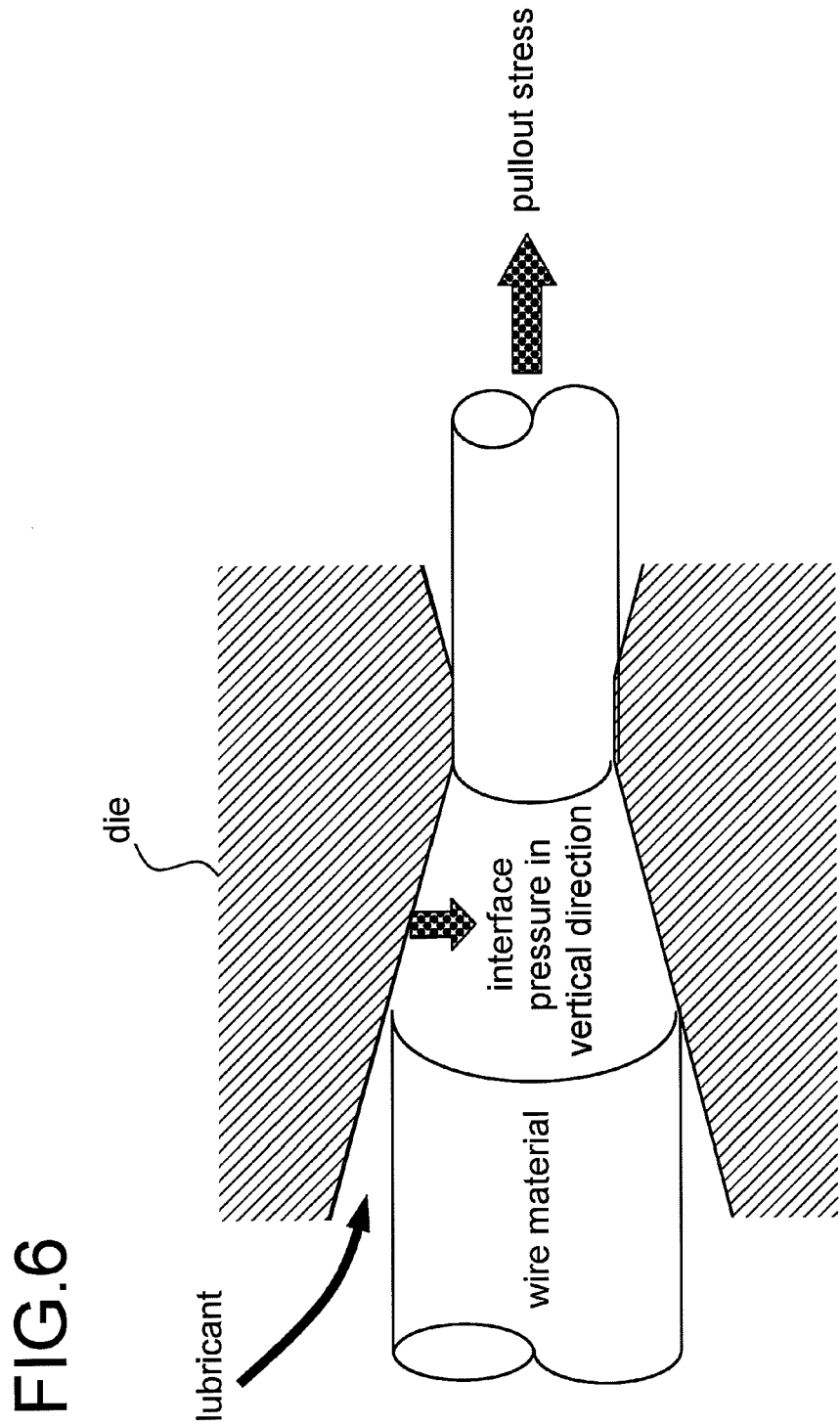
FIG. 6 illustrates the direction of stress applied to the galvanized base wire during wire drawing.

The stress applied to a galvanized base wire during wire drawing varies, as shown in FIG. 6, from the interior of the base wire to the surface of the base wire.

During wire drawing, the surface of the galvanized base wire that is held by wire drawing dies is exposed to a large interface pressure generated in the vertical direction between the wire drawing dies and galvanized base wire. On the contrary, tensile stress acts in the interior of the galvanized base wire with influence of a pullout force.

Figure 16:
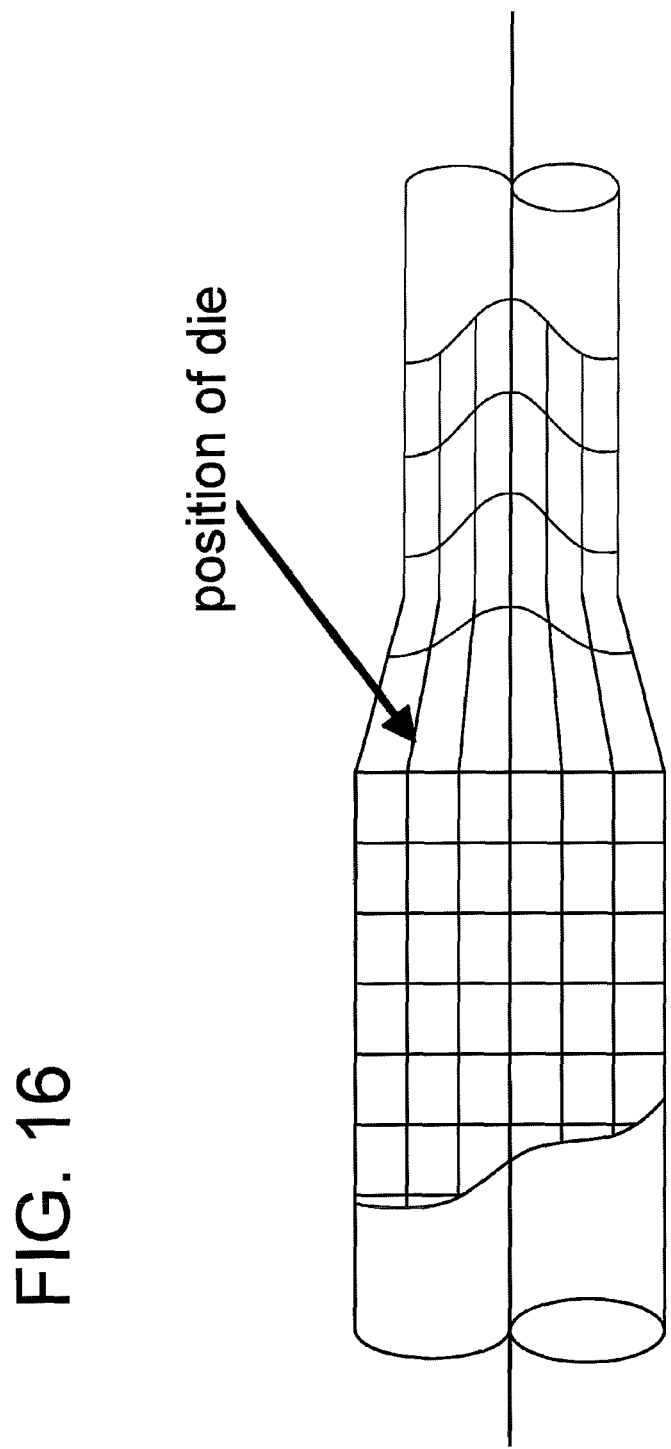
FIG. 16 is a flow of galvanized base wire in a wire drawing die.

FIG. 16 schematically shows the flow of metal during wire drawing to explain how the galvanized base wire is deformed in a die.

FIG. 16 shows that vertical lines of grid lines before the wire is drawn are curved after being drawn (forward phenomenon). This is caused by friction between the galvanized base wire and the wall of the wire-drawing die. An increase of the friction increases the vertical stress on the surface portion, and therefore the longitudinal deformation of the surface portion is less than deformation in the center portion of the wire. Accordingly, larger frictional force (deformation resistance) is preferable to increase the interface pressure in the vertical direction on the surface of the galvanized base wire.

Based on the principle, in order to make a frictional force on the contact surface large to increase the interface pressure such that the crashed particles are deeply embedded in the core, water is used instead of oil-based lubricants generally used as a wire-drawing lubricant, because water has less of a lubricating effect (dynamic friction coefficient of approximately 0.36 obtained through pendulum type measuring method) than that of oil-based lubricants (dynamic friction coefficient of approximately 0.1 obtained through pendulum type measuring method).

To achieve Approach 3, the rate of wire drawing is set to 94.0% or higher to deeply embed the particles of the diffusion alloy layer, which was crashed during wire drawing, in the core, thereby integrating the zinc layer and diffusion alloy layer with the core to prevent the layers from falling off from the core.

The rate of wire drawing can be determined by the following equation.

Rate of wire drawing (%)=[(cross-sectional area before being drawn−cross-sectional area after being drawn)/cross-sectional area before being drawn]×100

Since the diffusion alloy layer has different deformation characteristics from the core (diffusion alloy layer has a lower degree of extensibility), the wire drawing process crashes the diffusion alloy layer into particles that make it easy for the zinc thin film and diffusion alloy layer to come off from the core.

Approach 3 deeply embeds the particles of the diffusion alloy layer in the core by making the difference in diameter between the initial galvanized base wire before being drawn and the end product after being drawn greater (i.e., increasing the rate of wire drawing) by extending the time required to embed the crashed diffusion alloy layer in the core and increasing the number of passes in which the wire passes through the dies to make the boundary length between the particles of the diffusion alloy layer and the core after wire drawing 1.20 times longer than the length of the same electrode wire having the boundary length, thereby integrating the zinc layer and diffusion alloy layer with the core and preventing exfoliation thereof.

Embodiment

Embodiment of the present invention will be described below.

Figure 2:
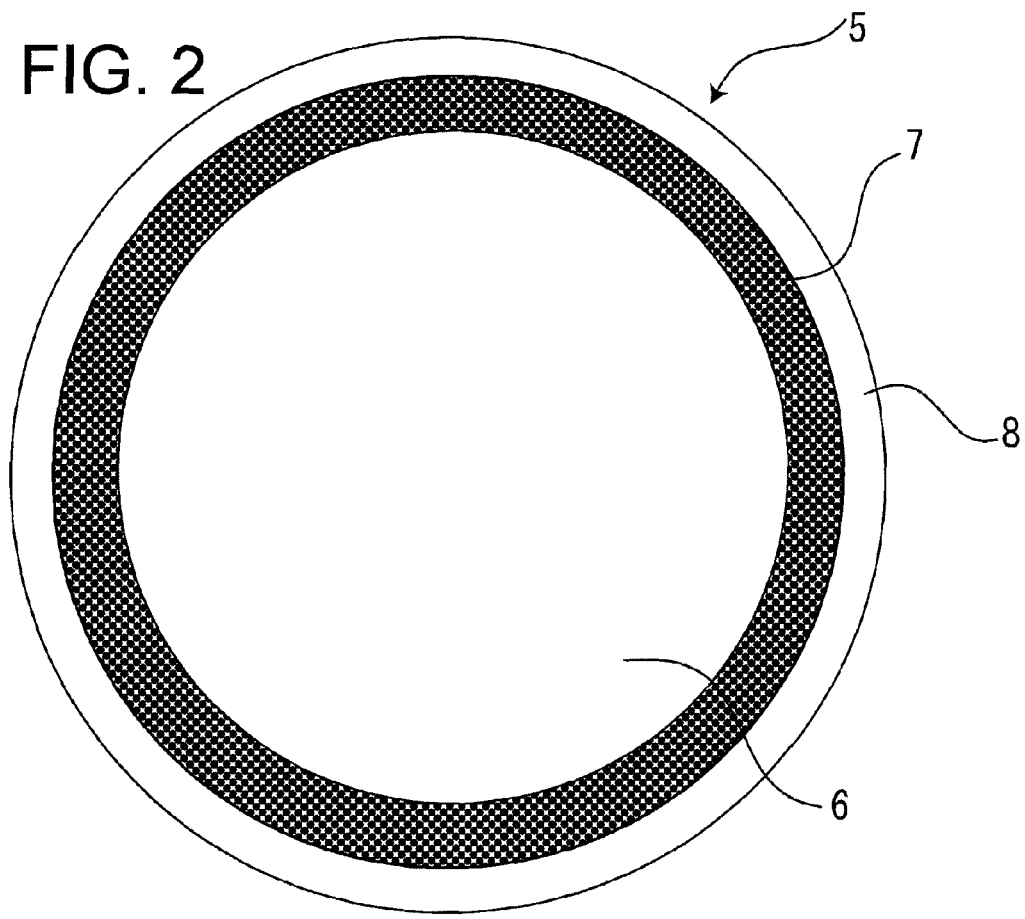
FIG. 2 is a cross-sectional view of a galvanized base wire of the present invention.
Figure 7:
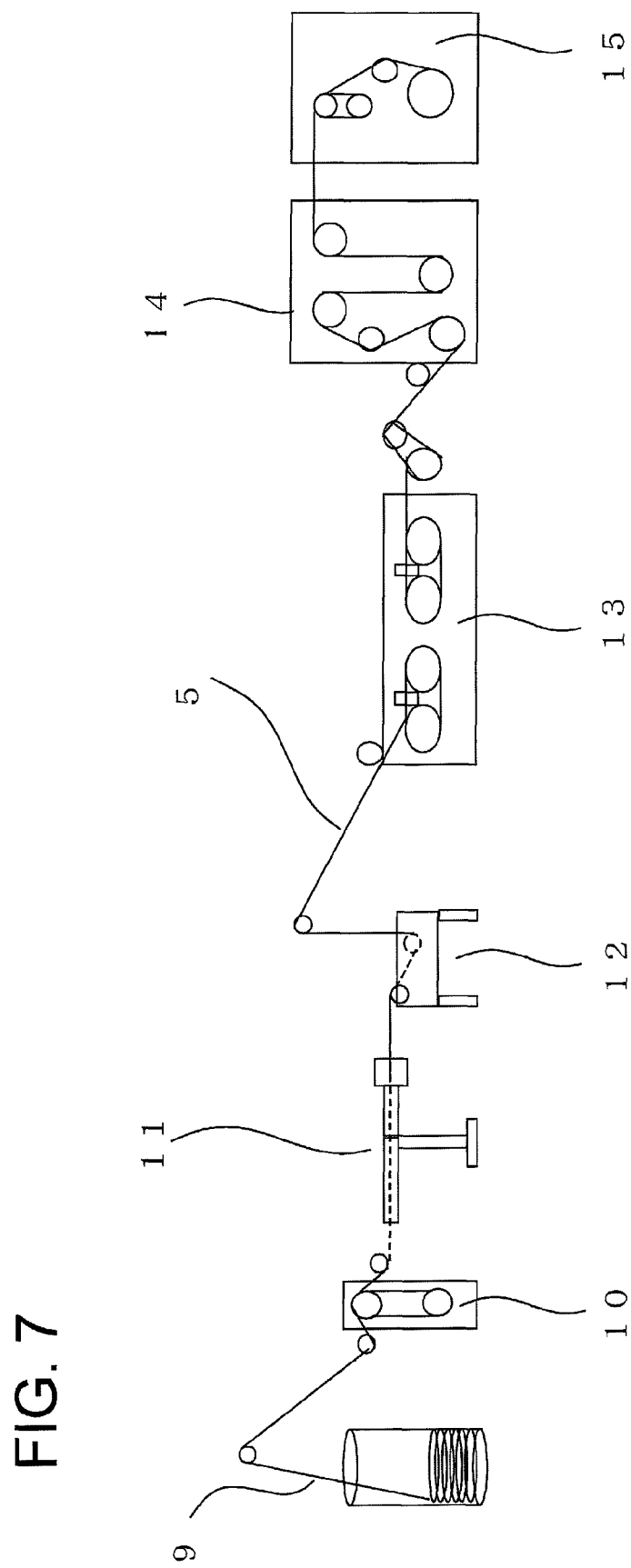
FIG. 7 depicts hot-dip galvanizing and a wire drawing apparatus.

FIG. 7 schematically shows a facility that performs the method for manufacturing the electrode wire 1 for wire electrical discharge machining according to the present invention. A wire-drawing apparatus 13 for the galvanized base wire 5 shown in FIG. 2 and annealer 14 can be arranged before a take-up apparatus 15 as shown in FIG. 7 or outside the facility so as to draw a already taken-up wire.

Controlling the temperature of hot-dip galvanizing and dipping time can determine the thickness of the copper-zinc alloy layer 7, which is a diffusion alloy layer, and the zinc layer 8. The tendencies of thickness variations will be shown below.

1. Diffusion Alloy Layer (Copper-Zinc Alloy Layer)
  a. The diffusion alloy layer becomes thinner when the dipping time is shorter as long as the temperature is the same.
  b. The diffusion alloy layer becomes thinner when the temperature is lower as long as the dipping time is the same.
2. Zinc Layer
  a. The zinc layer becomes thicker when the dipping time is shorter as long as the temperature is the same.
  b. The zinc layer becomes thicker when the temperature is lower as long as the dipping time is the same.

Figure 3:
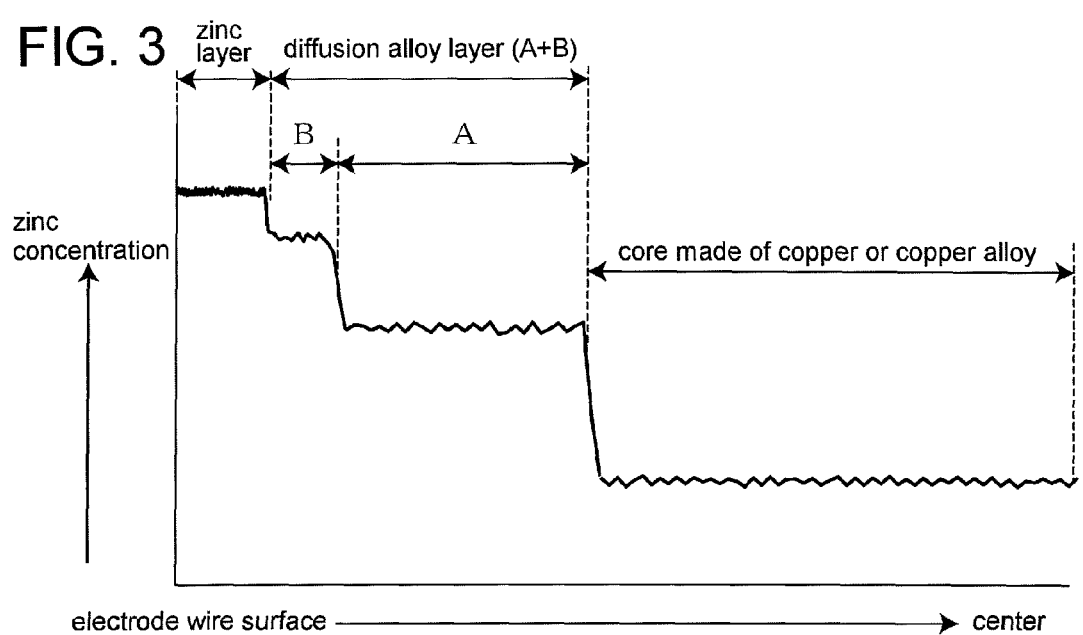
FIG. 3 shows the zinc concentration and thickness of the galvanized base wire in the radial direction.

The galvanized base wire 5 used to obtain the electrode wire 1 as shown in FIG. 1 of the present invention is made based on the aforementioned standpoints, and appropriate selection of the hot-dip galvanizing temperature and dipping time to control the thickness of the diffusion alloy layer 7 and zinc layer 8 results in a galvanized base wire 5 having a three-layer structure, including a core 6 made of copper or copper alloy, a diffusion alloy layer 7 and a hot-dip galvanized layer 8, with a zinc concentration gradient as shown in FIG. 3.

Subsequent wire drawing process for the galvanized base wire 5 to reduce its cross-sectional area provides an electrode wire 1 for wire electrical discharge machining, as shown in FIG. 1, that has a predetermined diameter and is composed of a core 2 made of copper or copper alloy, a layer made of particles of diffusion alloy layer 3 crashed by wire drawing and embedded in the core, and a zinc layer 4.

The high-speed-machining electrode wire 1 configured according to the present invention can be obtained by combination of the following three approaches in a wire drawing process. First, the effect of each approach will be described.

To evaluate the electrical discharge machining properties, a wire electrical discharge machine SX10 from Mitsubishi Electric Corporation was used under conditions set for rough machining. (Workpiece: material; SKD-11, thickness; 50 mm)

TABLE 2

| Approach | content |
| --- | --- |
| Approach 1 | Make the temperature of a zinc layer 8 of a galvanized base wire 5 during wire drawing 100° C. to 150° C. in order to make it possible for even a thin zinc layer 8 to cover cracks in a diffusion alloy layer. To that end, use a wire-drawing lubricant at a temperature ranging from 75° C. to 100° C. in anticipation of a temperature rise caused by frictional heat generated between wire-drawing dies and the galvanized base wire. |
| Approach 2 | Use water to increase friction resistance between wire-drawing dies and a galvanized base wire 5 to generate a interface pressure in the vertical direction at an interface between walls of the dies |

TABLE 2-continued

| Approach | content |
| --- | --- |
|  | and the base wire so as to reliably crash a diffusion alloy layer into particles that are in turn embedded deeply in the core such that the boundary length between the particles and core becomes 1.20 times longer than the length of the same electrode wire having the boundary length, thereby integrating the zinc layer 4, diffusion alloy layer 3 with the core 2 and preventing exfoliation. |
| Approach 3 | Perform a wire drawing process at an increased wire-drawing rate by extending the time required to embed the diffusion alloy layer 3 in the core 2 and increasing the number of passes in which the electrode wire passes through the dies to reliably crash the diffusion alloy layer 3 into particles and deeply embedding the particles in the core 2 such that the boundary length between the particles and core 2 becomes 1.20 times longer than the length of the same electrode wire having the boundary length, thereby integrating the zinc layer 4, diffusion alloy layer 3 with the core 2 and preventing exfoliation. |

Effect of Approach 1

To demonstrate the effects of Approach 1, brass wires (copper 60%/zinc 40%) of 0.9 mm in diameter subjected to melting, casting and wire drawing processes were prepared as non-galvanized base wires 9. The non-galvanized base wires were submerged in a hot-dip galvanizing bath of controlled temperatures for controlled dipping times in the manufacturing facility in FIG. 7 to form three kinds of galvanized base wires 5, as shown in Table 3, having diffusion alloy layers 7 of the same thickness and zinc layers 8 of different thicknesses.

TABLE 3

| outer diameter of non-galvanized base wire | ratio of diffusion layer thickness to outer diameter (%) | ratio of zinc layer thickness to outer diameter (%) | Ratio of galvanized layer thickness (diffusion alloy layer + zinc layer) to outer diameter (%) |
| --- | --- | --- | --- |
| 0.9 mmΦ | 0.9% | 0.6% | 1.5% |
|  |  | 1.2% | 2.1% |
|  |  | 2.4% | 3.3% |

The three kinds of galvanized base wires 5 were subjected to wire drawing with oil-based wire-drawing lubricants of three different temperatures to form three kinds of electrode wires 1 that have 0.25 mmφ in diameter and includes zinc layers 4 with thicknesses at different ratios (the thickness ratios of the zinc layers to the outer diameter were 0.6%, 1.2% and 2.4%).

Thus formed nine kinds of electrode wires were evaluated focusing on the following points.

a. The relationship between the temperatures of lubricants used to form the electrode wires having the zinc layers of different thicknesses and cracks generated in the circumference surfaces of the drawn electrode wires.

b. The relationship between the thicknesses of the zinc layers of the electrode wire and the widths of the machined grooves.

Figure 8:
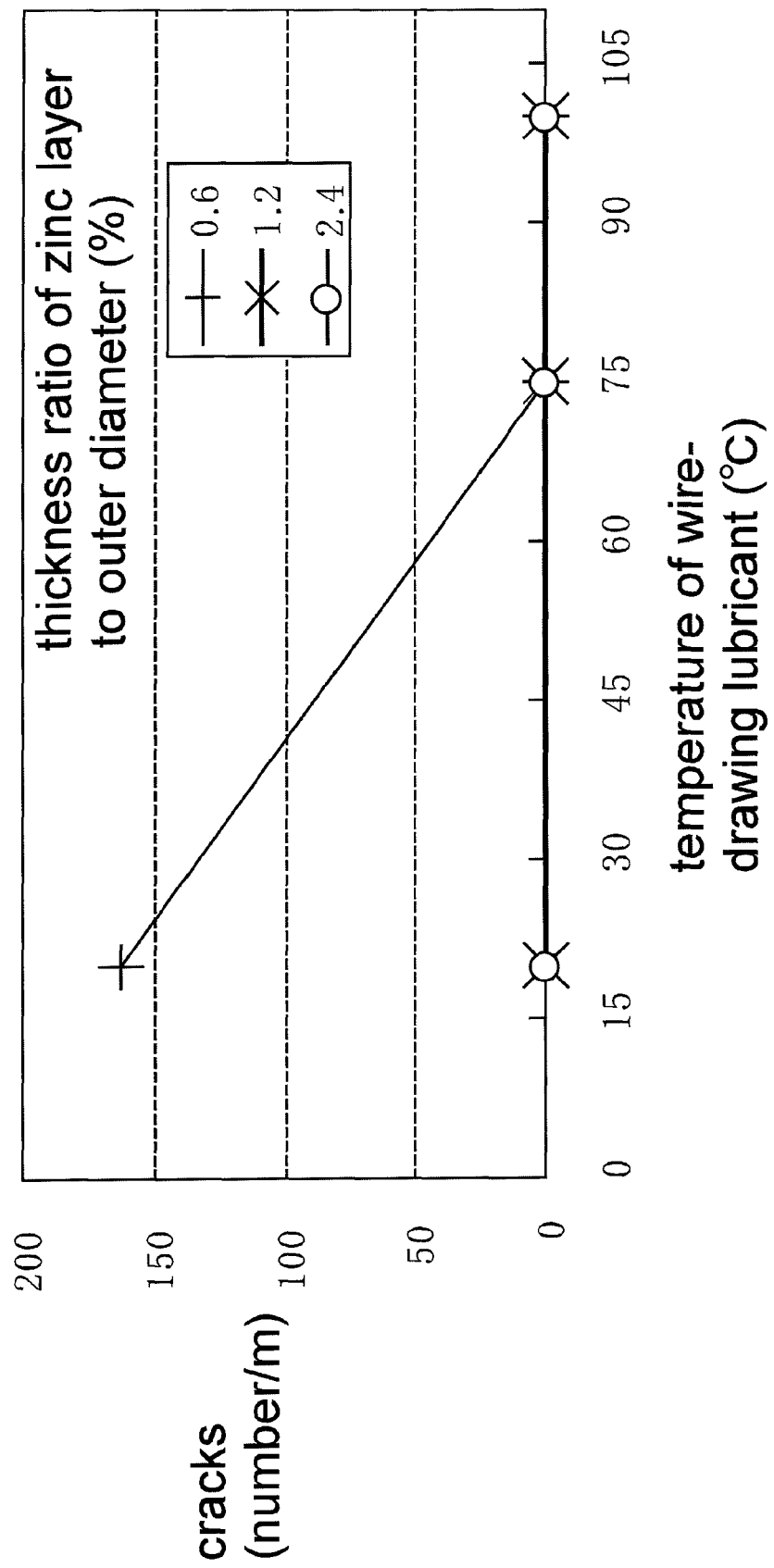
FIG. 8 illustrates the relationship between the temperatures of a lubricant applied to electrode wires having zinc layers with different thicknesses and cracks appearing in the circumference surface of the electrode wire.
Figure 9:
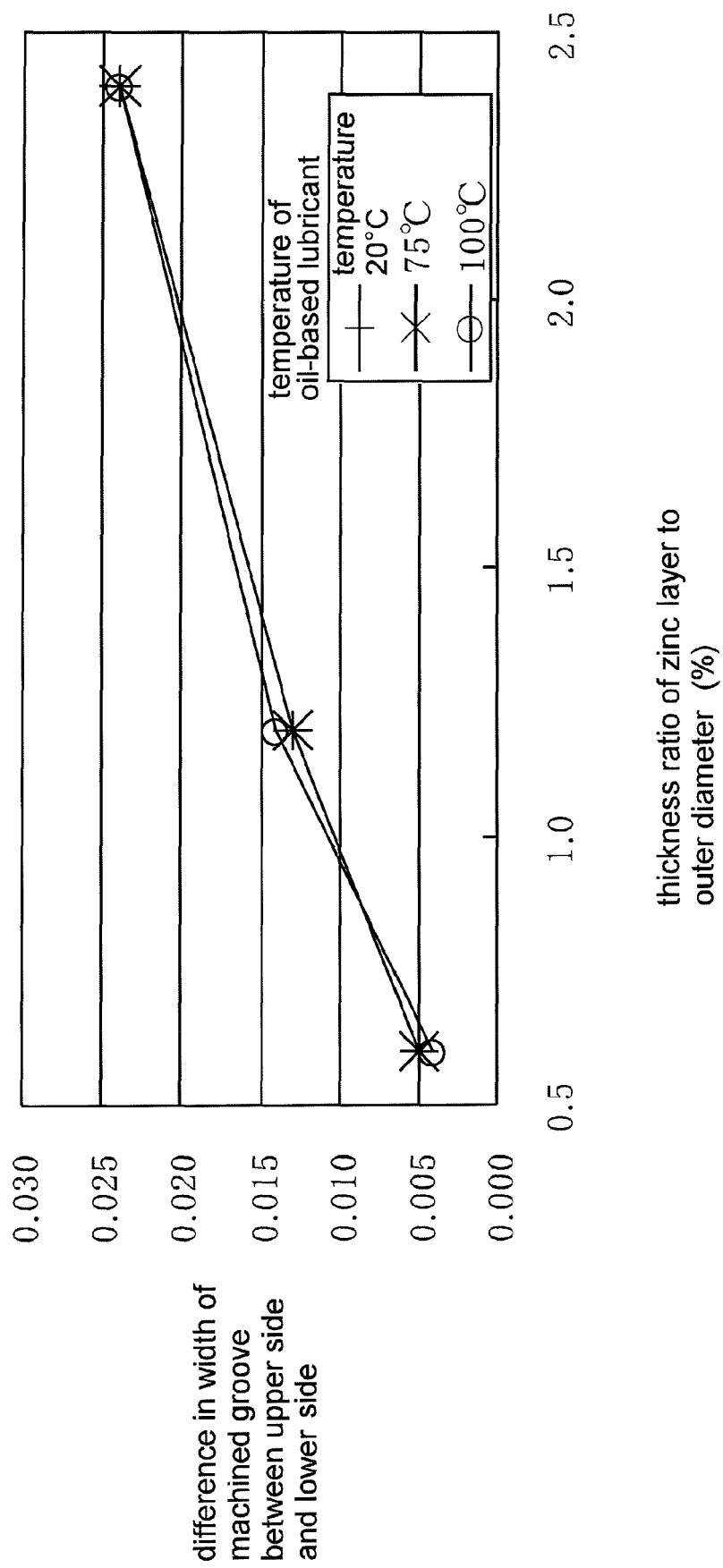
FIG. 9 illustrates the relationship between the thicknesses of zinc layers in electrode wires and the widths of machined grooves.

The evaluation results will be presented in FIGS. 8 and 9.

As is apparent from FIG. 8, the lubricants at 75° C. to 100° C. cause no cracks in the surface of the electrode wires with the zinc layers of any thicknesses after wire drawing, but when the galvanized base wires 5 each including a thin zinc layer (0.6% of outer diameter) were drawn with the lubricants at 20° C., they turn into an electrode wire having cracks in the surface thereof.

Figure 4:
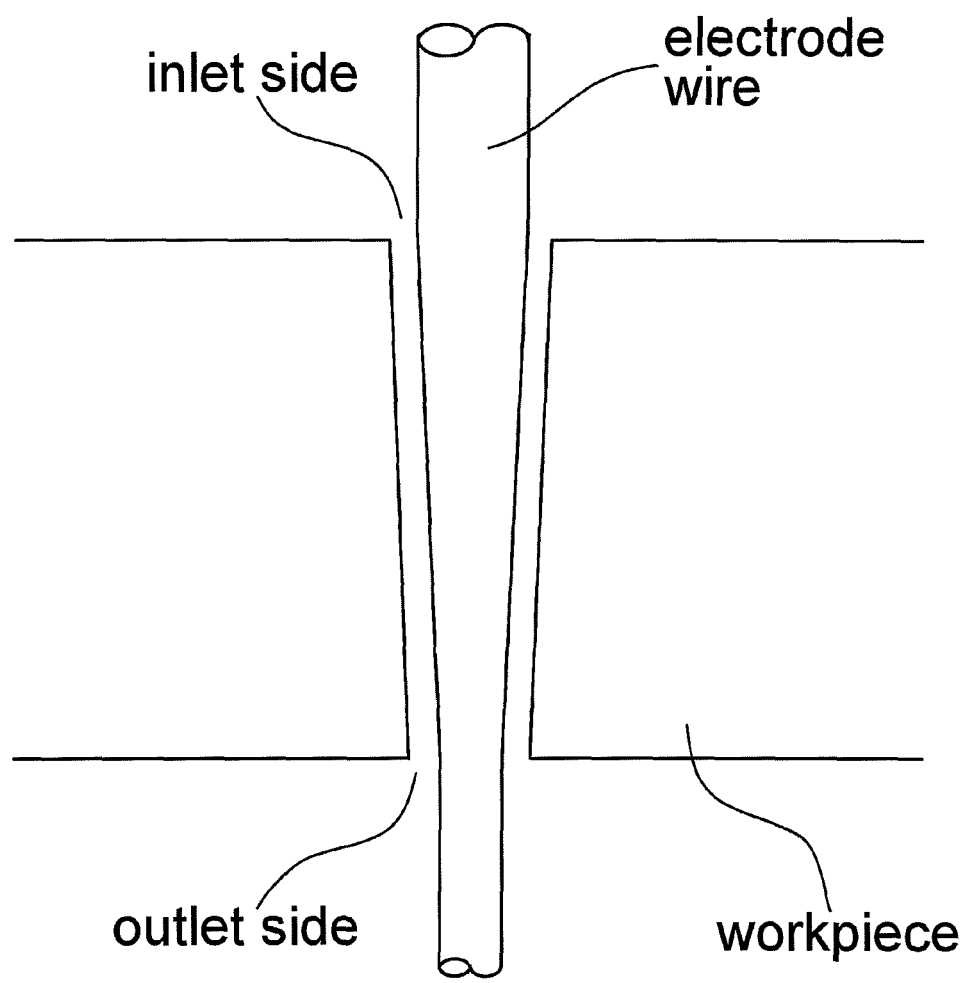
FIG. 4 depicts the state of the electrode wire during electrical discharge machining.
Figure 5:
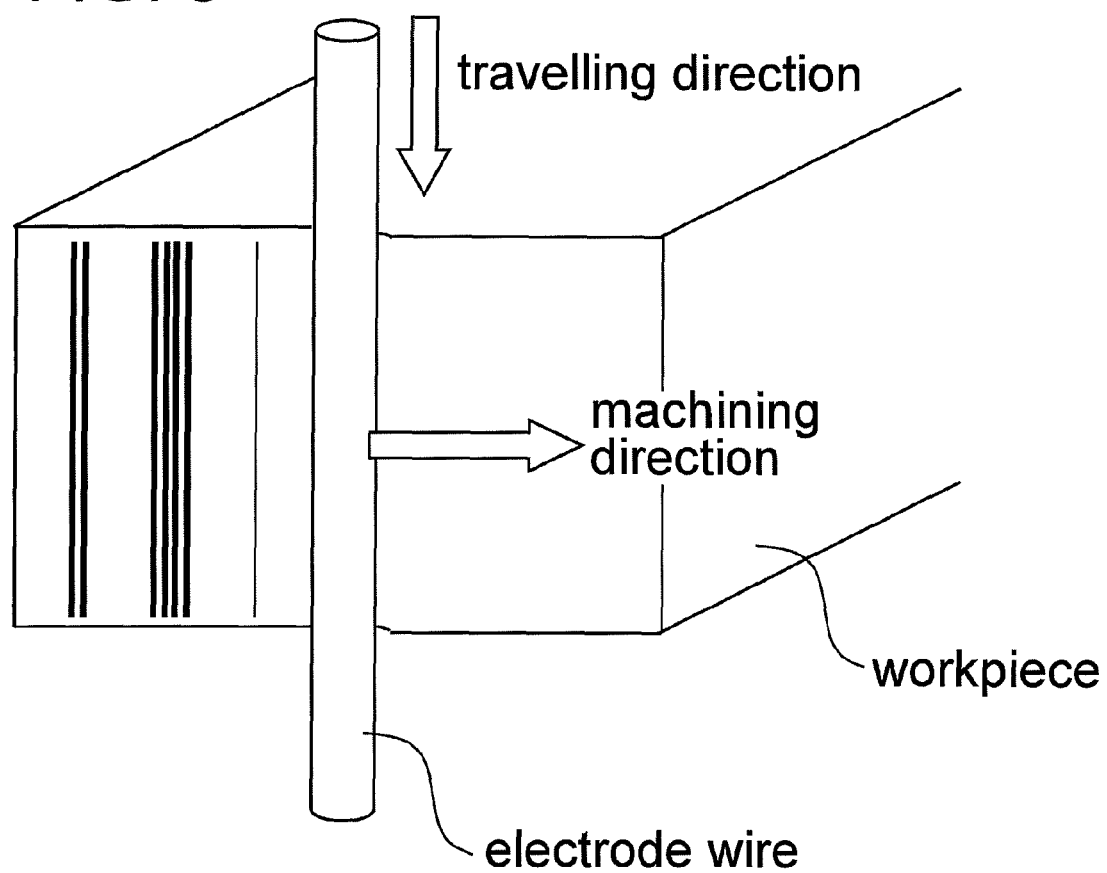
FIG. 5 is a schematic diagram of streaks on a machined surface.

As is apparent from FIG. 9, since the evaporation temperature of zinc is low, thicker zinc layers evaporate and shatter more at the start of electrical charging, and the electrode wire reduces its diameter as shown in FIG. 4. Then, a difference occurs in a machined groove of the workpiece between an inlet side and an outlet side and therefore the machined surface is tapered, resulting in poor machining accuracy. These results show that drawing a galvanized base wire with a thin zinc layer using a wire-drawing lubricant of 75° C. to 100° C. provides an electrode wire 1 having excellent machining accuracy and no cracks in the circumference surface of the electrode wire.

Effect of Approach 2

To demonstrate the effects of Approach 2, three kinds of galvanized base wires 5 including diffusion alloy layers 7 of the same thickness and zinc layers 8 of different thicknesses were prepared in like manner with Approach 1. Then, these galvanized base wires 5 were subjected to wire drawing with an oil-based lubricant and water of 20° C. as a wire-drawing lubricant to form three kinds of electrode wires 1 that have 0.25 mmφ in diameter and include galvanized layers (zinc layer 4+diffusion alloy layer 3) with thicknesses at different ratios (the thickness ratios of the galvanized layers to the outer diameter were 1.5%, 2.1% and 3.3%).

Thus formed six kinds of electrode wires were evaluated focusing on the following points.

a. The state of particles of diffusion alloy layers embedded in cores according to kinds of lubricants.

b. The relationship between the kinds of lubricants applied to the electrode wires including the galvanized layers of different thicknesses and the number of shorts.

c. The relationship between the presence/absence of shorts and formation of streaks on the machined surfaces.

d. The relationship between the number of shorts and machining speed.

e. The relationship between the kinds of the lubricants and the boundary length between the particles of the diffusion alloy layer and the core.

The evaluation results will be shown in FIGS. 10, 11, 12, 13 and 17.

Figure 10A:
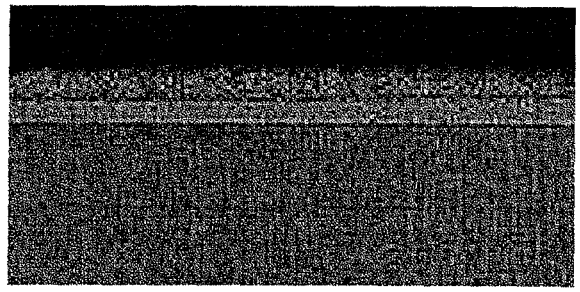
FIG. 10A shows a galvanized base wire before crashed.
Figure 10B:
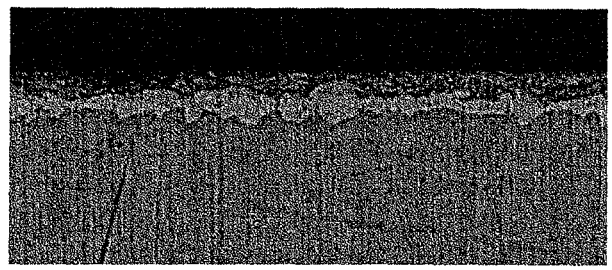
FIG. 10B shows an electrode wire drawn with water as a wire-drawing lubricant.
Figure 10C:
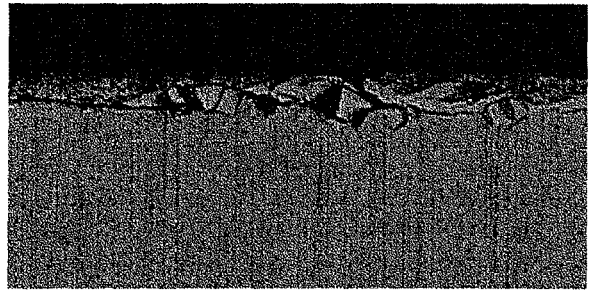
FIG. 10C shows an electrode wire drawn with oil as a wire-drawing lubricant.

As shown in FIG. 10(B), an electrode wire 1 (the thickness ratio to the outer diameter is 2.1%) drawn with water as a wire-drawing lubricant has particles of the diffusion alloy layer 3 deeply embedded in the core 2, while electrode wires (the thickness ratios to the outer diameter are 2.1% and 3.3%), shown in FIG. 10(C), drawn with an oil-based wire-drawing lubricant have particles of the diffusion alloy layer 3 floating on the core 2.

FIG. 17 shows that the boundary length between particles of the diffusion alloy layer and the core as to the electrode wire with the particles of the diffusion alloy layer 3 deeply embedded in the core 2 and the electrode wire with the particles of the diffusion alloy layer 3 floating on the core 2 shown in FIG. 10.

The boundary length was measured by means of a circumference measurement mode of a digital microscope VHX-900 of KEYENCE CORPORATION.

The measurement results in FIG. 17 show that the electrode wire drawn with water of 20° C. and having particles of crashed diffusion alloy layer 3 deeply embedded in the core 2 has a boundary length 1.20 to 1.22 times longer than the length of the same electrode wire having the boundary length, while the electrode wires drawn with an oil-based lubricant of 20° C. and having particles of the crashed diffusion alloy layer 3 floating on the core 2 have an boundary length 1.10 to 1.11 longer than the length of the same the electrode wires having the boundary length, which means that the electrode wire with the particles of the diffusion alloy layer 3 deeply embedded has a longer boundary length.

Figure 11:
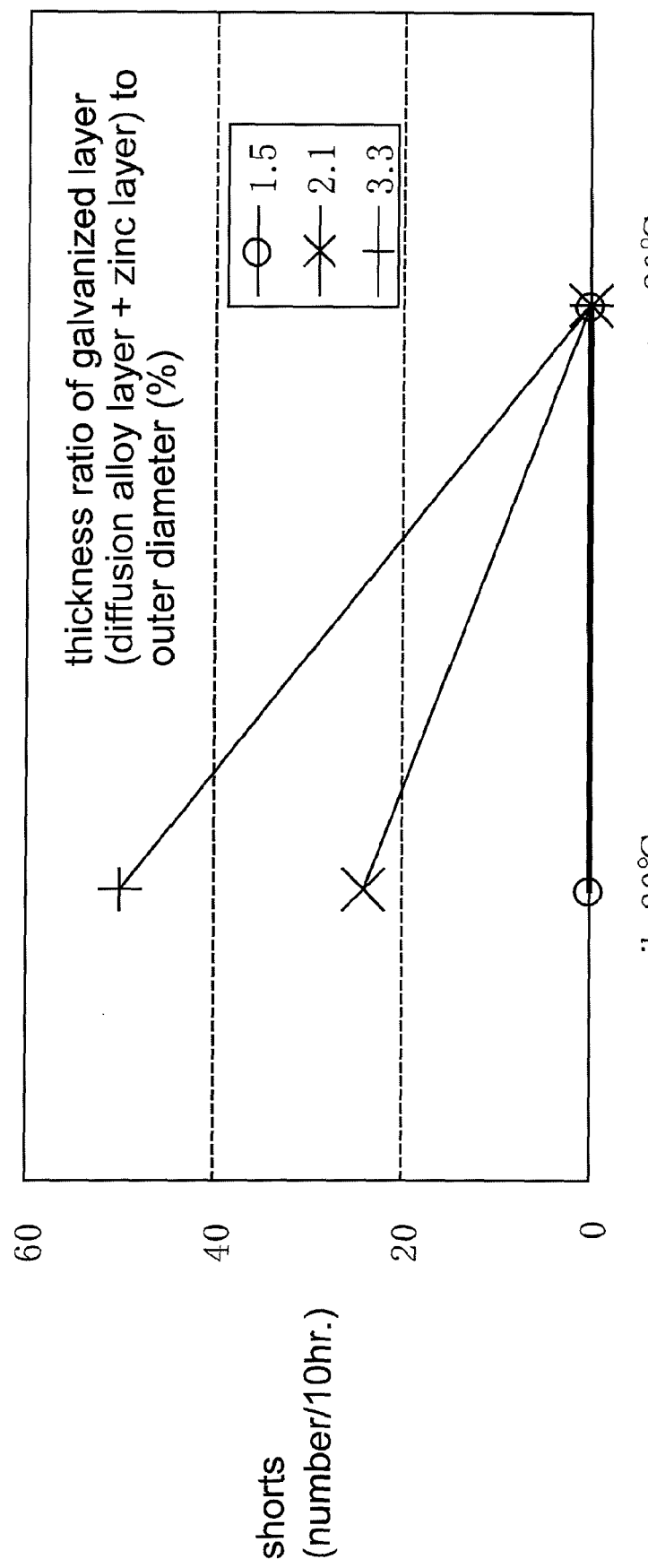
FIG. 11 illustrates the relationship between the kinds of lubricants and the number of shorts.

As shown in FIG. 11, even if an electrode wire has a thick galvanized layer, drawing the electrode wire with water to have a long boundary length can integrate the zinc layer and diffusion alloy layer with the core and prevent exfoliation and therefore shorts do not occur between the electrode wire and workpiece.

Figure 12A:
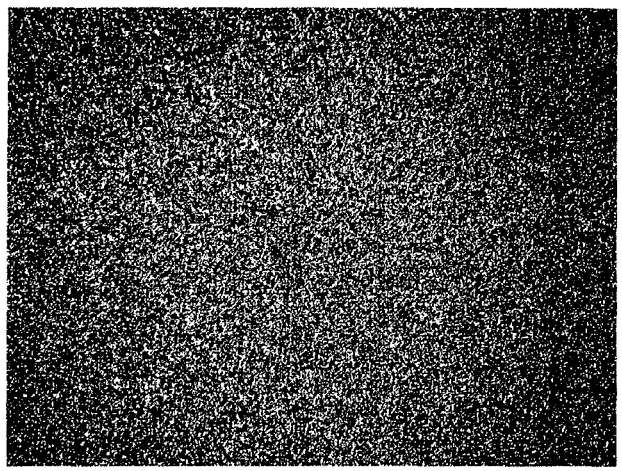
FIG. 12A shows an electrode wire without shorts.
Figure 12B:
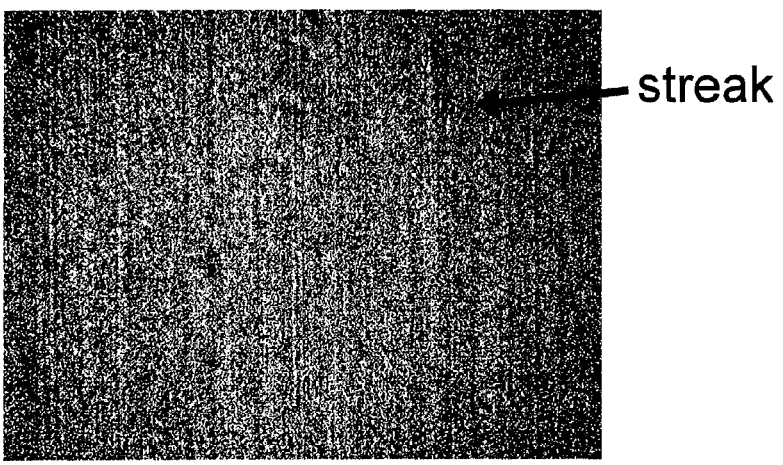
FIG. 12B shows an electrode wire with shorts.

FIG. 12(B) shows that an electrode wire (with a galvanized layer constituting 2.1% of the outer diameter, drawn with an oil-based lubricant) causes shorts and therefore leaves fine streaks, which are a collection of craters, on the machined surface, while FIG. 12 (A) shows that an electrode wire (with a galvanized layer constituting 2.1% of the outer diameter, drawn with water) does not cause shorts and therefore leaves no fine streaks on the machined surface.

Figure 13:
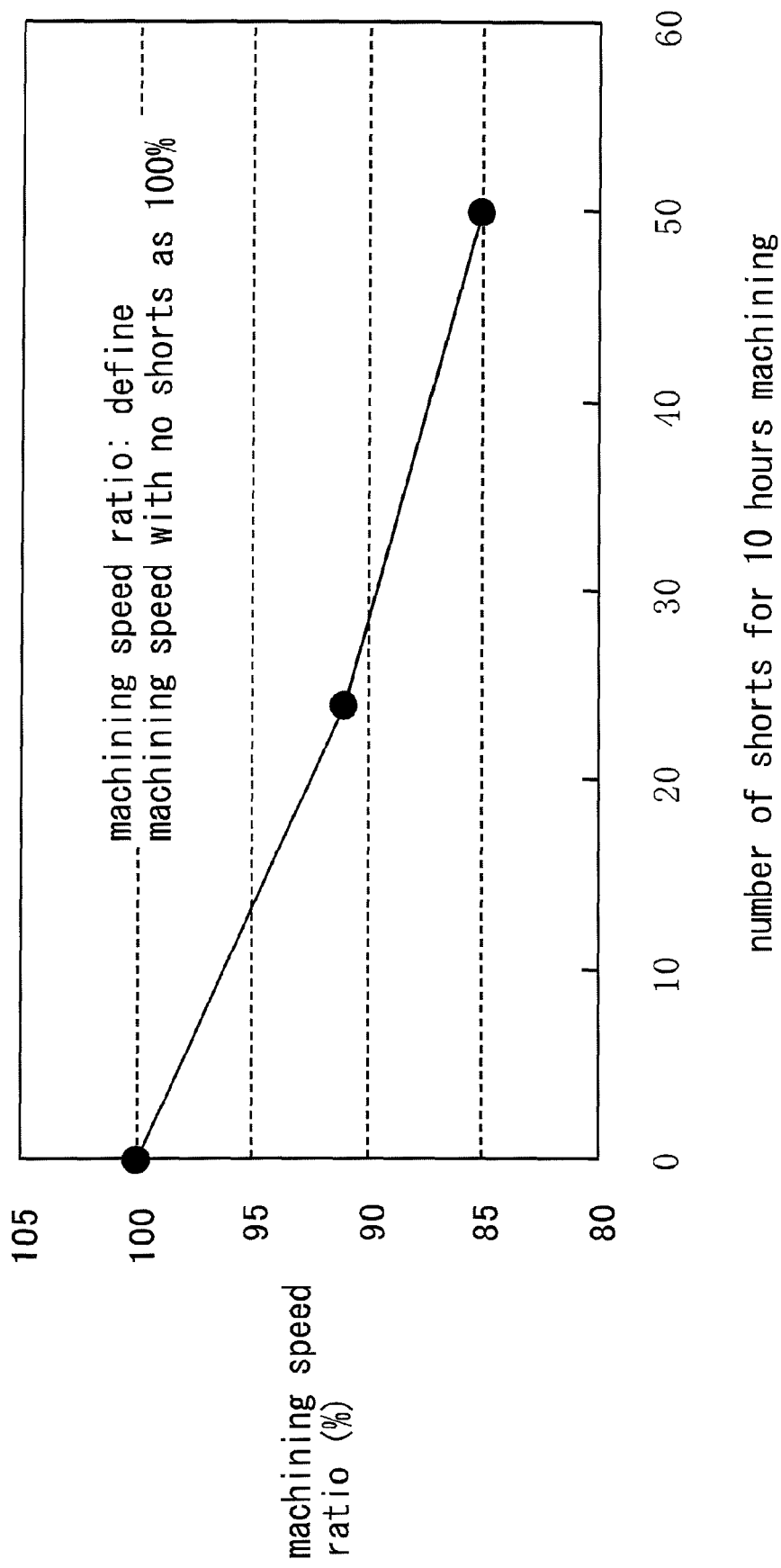
FIG. 13 illustrates the relationship between the number of shorts and machining speed.

FIG. 13 shows that an increasing number of shorts decreases the machining speed with the reduction of the number of electrical discharges.

These results demonstrate that the use of water as a wire-drawing lubricant can prevent shorts and provide an electrode wire that leaves no streaks on the machined surface of a workpiece and does not cause the machining speed reduction.

Effect of Approach 3

To demonstrate the effects of Approach 3, galvanized base wires 5 were prepared, in like manner with Approach 1, from non-galvanized base wires 9 with diameters chosen such that finished electrode wires 1 would have a diameter of 0.25 mmφ after wire-drawn at wire-drawing rates of 92.3%, 93.8%, 95.7% and 97.8%, respectively. Then, the galvanized base wires 5 were drawn with an oil-based lubricant of 20° C. to form electrode wires that have a diameter of 0.25 mmφ and galvanized layers (zinc layer 4+diffusion alloy layer 3) of three different thicknesses (1.5%, 2.1%, and 3.3% of the outer diameter).

Thus formed twelve kinds of electrode wires were evaluated focusing on the following points.

a. The state of particles of the diffusion alloy layers embedded in cores according to rates of wire drawing.

b. The relationship between the rate of wire drawing and the number of shorts.

c. The relationship between the presence/absence of shorts and formation of streaks on the machined surfaces.

d. The relationship between the number of shorts and machining speed.

e. The relationship between the rate of wire drawing and the boundary length between the particles of the diffusion alloy layer and the core.

Figure 14A:
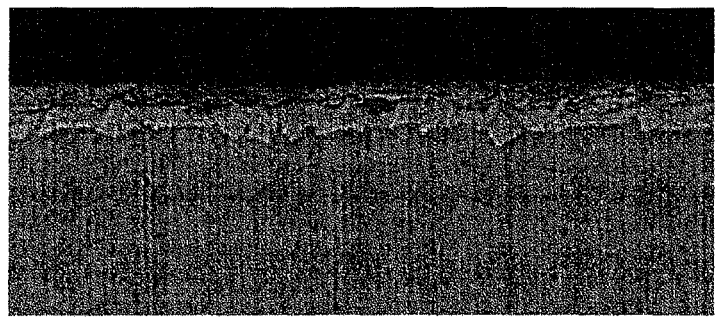
FIG. 14A shows an electrode wire drawn at a rate of 95.7%.
Figure 14B:
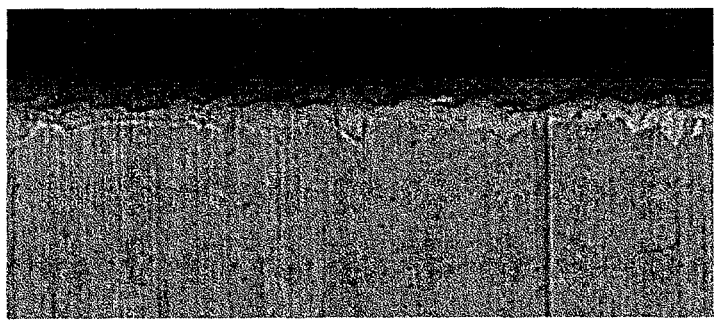
FIG. 14B shows an electrode wire drawn at a rate of 93.8%.
Figure 14C:
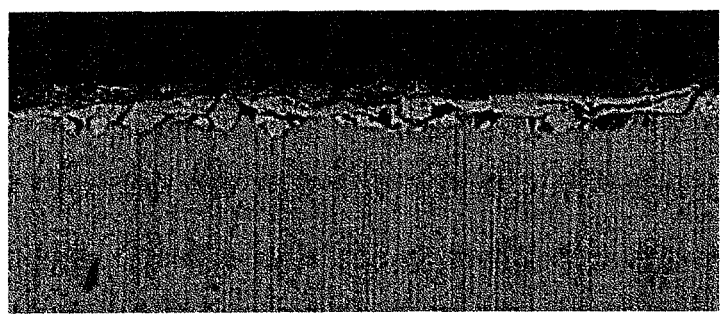
FIG. 14C shows an electrode wire drawn at a rate of 92.3%.
Figure 15:
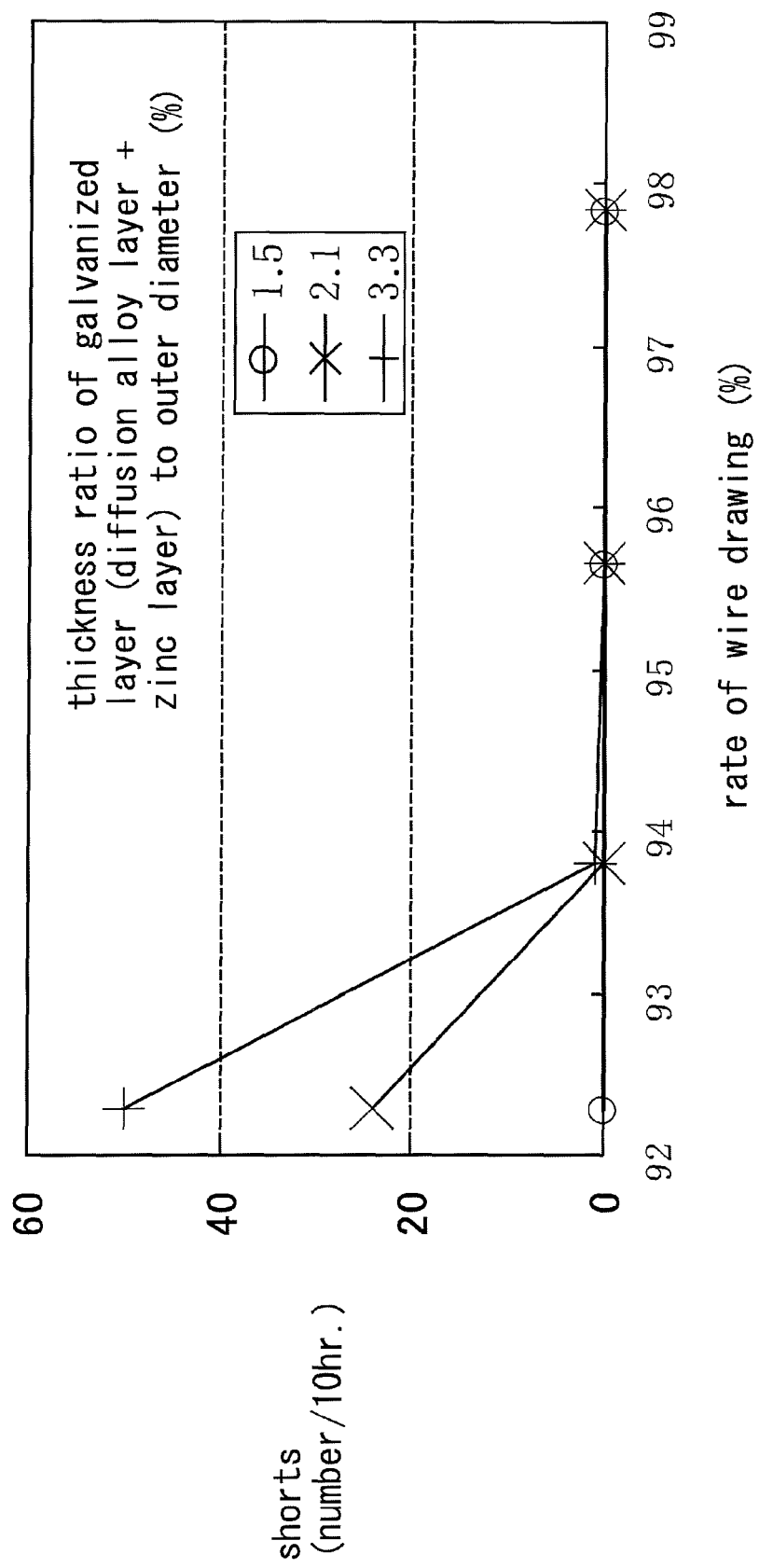
FIG. 15 illustrates the relationship between the rates of wire drawing and the number of shorts.

The evaluation results will be shown in FIGS. 14 and 15.

All photocopies in FIG. 14 show electrode wires formed by drawing base wires having a galvanized layer with a thickness constituting 2.1% of the outer diameter. Even though an oil-based lubricant of 20° C. is used, electrode wires 1 drawn at wire-drawing rates of 93.8%, 95.7% and 97.8%, respectively, have particles of the diffusion alloy layers deeply embedded in the cores 2; however, electrode wires drawn at a wire-drawing rate of 92.3% (the electrode wires having galvanized layers with a thickness constituting 2.1% and 3.3% of the outer diameter, respectively) include particles of the diffusion alloy layers 3 floating on the cores 2.

The electrode wires with particles of the diffusion alloy layers 3 deeply embedded in the cores 2 and the electrode wire with particles of the diffusion alloy layer 3 floating on the core 2 in FIG. 14 were measured to obtain the boundary length between the diffusion alloy layer particles and core in the same way as Approach 2. The measurement results show that the boundary lengths of the electrode wires with the particles of the diffusion alloy layers 3 deeply embedded in the cores are 1.21 to 1.23 times longer than the lengths of the same electrode wires having the boundary lengths, while the boundary lengths of the electrode wires with the particles of the crashed diffusion alloy layers 3 floating on the cores 2 are 1.10 to 1.12 times longer than the lengths of the same electrode wires having the boundary lengths, resulting in that the electrode wires drawn at high wire-drawing rates have longer boundary lengths.

In addition, as shown in FIG. 15, even if the electrode wires having longer boundary lengths obtained by high rates of wire drawing have thicker galvanized layers, shorts do not occur between the electrode wire and workpiece during electrical discharge machining because the zinc layer and diffusion alloy layer are integrated with the core and do not fall off.

Consequently, wire drawing at high wire-drawing rates provides an electrode wire that does not cause shorts, streaks on the machined surface and machining speed reduction.

The present invention can be implemented with various examples by combining the aforementioned three approaches.

Some examples of the present invention will be shown in Table 1. Each example is implemented with two or three of the approaches (conditions to which the present invention is applied are shown by bold letters and a hatch pattern), while comparative examples are formed through none of the three approaches.

As is apparent from Table 1, any electrode wires (Examples 1 to 4) formed through at least two approaches of the present invention achieve good results. The comparative examples 1 and 2 formed through none of the three approaches, however, cause a short between the electrode wire and workpiece, resulting in finely formed streaks on the machined surface and machining speed reduction derived from the workpiece-electrode wire short that decreases the number of electrical discharges.

The electrode wire examples of the present invention can operate at approximately 20% improved machining speed compared with the brass solid (copper 60%/zinc 40%) electrode wire of comparative example 3.

The above-described examples and comparative examples are electrical-discharge-machining electrode wires each having an outer diameter of 0.25 mm; however, the present invention can be applied to electrode wires of any outer diameters, for example, from 0.1 to 0.3 mm, and ensures the same quality.

TABLE 1

| | number | diameter of galvanized base wire (mm) | diameter after wire-drawing (mm) | kind of wire-drawing lubricant | temperature of wire-drawing lubricant | wire-drawing rate (%) | diffusion alloy layer thickness (μm) | zinc layer thickness (μm) |
|---|---|---|---|---|---|---|---|---|
| examples | 1 | 1.2 | 0.25 | oil | 75° C. | 95.7 | 2.3 | 1.5 |
| | 2 | 0.9 | 0.25 | water | 75° C. | 92.3 | 2.3 | 1.5 |
| | 3 | 1.2 | 0.25 | water | 20° C. | 95.7 | 2.3 | 3.0 |
| | 4 | 1.2 | 0.25 | water | 75° C. | 95.7 | 2.3 | 1.5 |
| comparative examples | 1 | 0.9 | 0.25 | oil | 20° C. | 92.3 | 2.3 | 2.5 |
| | 2 | 0.9 | 0.25 | oil | 20° C. | 92.3 | 2.3 | 6.0 |
| | 3 | 60/40 brass wire 0.25 mm | | | | | | |

| | number | thickness ratio of galvanized layer (diffusion alloy layer + zinc layer) to outer diameter (%) | number of cracks (number/m) | number of shorts (per 10 hr.) | streaks on machined surface | machining rate relative to 60/40 brass wire (%) | groove width difference ○: ≦15 μm X: >15 μm |
|---|---|---|---|---|---|---|---|
| examples | 1 | 1.5 | 0 | 0 | none | 121 | ○ |
| | 2 | 1.5 | 0 | 0 | none | 121 | ○ |
| | 3 | 2.1 | 0 | 0 | none | 121 | ○ |
| | 4 | 1.5 | 0 | 0 | none | 121 | ○ |
| comparative examples | 1 | 1.9 | 53 | 14 | yes | 114 | ○ |
| | 2 | 3.3 | 0 | 50 | yes | 103 | X |
| | 3 | 60/40 brass wire 0.25 mm | 0 | 0 | none | 100 | ○ |

The effects of the present invention are as follows.

According to the present invention, an outer layer in the form of a dense collection of particles of crashed copper-zinc thermal diffusion layer is embedded in the core through simple manufacturing processes with simple facilities, and therefore the core and galvanized layer are integrated by the thermal diffusion alloy layer to prevent the galvanized layer and diffusion alloy layer from falling off from the core.

Since the configuration can prevent shorts between the workpiece and electrode wire during electrical discharge machining, the present invention can provide a high-speed-machining electrode wire that prevents deceleration of machining speed due to reduction in the number of electrical discharges and prevents fine streaks, which are collections of craters caused by unstable electrical discharges, from being formed on the machined surface in the travelling direction of the electrode wire.

Furthermore, unlike conventional machining methods requiring electrode wire replacement for different machining processes, for example, using a high-speed-machining electrode wire including a zinc layer and copper-zinc diffusion alloy layer on its circumference surface for making a rough cut and a solid brass electrode wire for giving a finish, the electrode wire of the present invention can be used not only for high-speed machining, but also for high-precision machining and does not need to be changed for each process, thereby saving stop/replacement time.

What is claimed is:

1. An electrode wire for wire electrical discharge machining, the electrode wire being made by drawing a base wire including a hot-dip galvanized layer formed on a circumference surface of a core made of copper or copper alloy and a diffusion alloy layer generated by thermal interdiffusion between the hot-dip galvanized layer and the core, wherein
the hot-dip galvanized layer is drawn based on the difference in malleability and ductility between the hot-dip galvanized layer and the diffusion alloy layer to become a zinc thin film without cracks, and the diffusion alloy layer is crashed by wire drawing into particles to be embedded in the circumference surface of the core such that the zinc thin film and the diffusion alloy layer are integrated with the core and do not fall from the core.

2. The electrode wire for wire electrical discharge machining according to claim 1, wherein the particles of the crashed diffusion layer are deeply embedded in the core through wire drawing at a high wire-drawing rate obtained by subtracting a cross-sectional area after the wire drawing from a cross-sectional area before the wire drawing to obtain a reduced cross-sectional area, dividing the reduced cross-sectional area by the cross-sectional area before the wire drawing and multiplying the result by 100.

3. The electrode wire for wire electrical discharge machining according to claim 1, wherein the particles of the crashed diffusion alloy layer are deeply embedded in the circumference surface of the core by receiving a large interface pressure in the vertical direction.

4. The electrode wire for wire electrical discharge machining according to claim 3, wherein the particles of the crashed diffusion layer are deeply embedded in the core through wire drawing at a high wire-drawing rate obtained by subtracting a cross-sectional area after the wire drawing from a cross-sectional area before the wire drawing to obtain a reduced cross-sectional area, dividing the reduced cross-sectional area by the cross-sectional area before the wire drawing and multiplying the result by 100.

5. The electrode wire for wire electrical discharge machining according to claim 1, wherein the zinc thin film without cracks is formed through wire drawing at a temperature within a range in which the zinc can maintain its good malleability and ductility under the influence of heat generated during wire drawing.

6. The electrode wire for wire electrical discharge machining according to claim 5, wherein the particles of the crashed diffusion layer are deeply embedded in the core through wire drawing at a high wire-drawing rate obtained by subtracting a cross-sectional area after the wire drawing from a cross-sectional area before the wire drawing to obtain a reduced cross-sectional area, dividing the reduced cross-sectional area by the cross-sectional area before the wire drawing and multiplying the result by 100.

7. The electrode wire for wire electrical discharge machining according to claim 5, wherein the particles of the crashed diffusion alloy layer are deeply embedded in the circumference surface of the core by receiving a large interface pressure in the vertical direction.

8. The electrode wire for wire electrical discharge machining according to claim 7, wherein the particles of the crashed diffusion layer are deeply embedded in the core through wire drawing at a high wire-drawing rate obtained by subtracting a cross-sectional area after the wire drawing from a cross-sectional area before the wire drawing to obtain a reduced cross-sectional area, dividing the reduced cross-sectional area by the cross-sectional area before the wire drawing and multiplying the result by 100.

9. A method for manufacturing an electrode wire for wire electrical discharge machining, the method including: preparing a galvanized base wire to be the electrode wire by passing a core made of copper or copper alloy through a plating bath containing zinc at a predetermined temperature for a dipping time to form a zinc layer having a thickness exceeding a predetermined thickness as an outermost layer of the core and to form a diffusion alloy layer through thermal interdiffusion occurring at an interface where the core and the zinc are in contact, and cooling the core with the zinc layer and diffusion alloy layer; and drawing the galvanized base wire,
wherein the galvanized base wire is subjected to wire drawing at a temperature within a range in which the zinc can maintain its good malleability and ductility to form a zinc thin film without cracks, and
wherein, in order to draw the galvanized base wire at a temperature within a range in which the zinc can maintain its good malleability and ductility, the temperature in a circulating reservoir of a wire-drawing lubricant that circulates to be supplied to the interface between a die and a wire material is controllably maintained at 75° C. to 100° C.

10. A method for electrical discharge machining using an electrode wire for wire electrical discharge machining, the electrode wire including a hot-dip galvanized layer formed on a circumference surface of a core made of copper or copper alloy and a thermal diffusion alloy layer formed between the core and the hot-dip galvanized layer, wherein
the thermal diffusion alloy layer is a layer made of a dense collection of crashed particles that integrate the core and the hot-dip galvanized layer and prevent the layer from separating from the core.

11. An electrode wire for wire electrical discharge machining, the electrode wire including a hot-dip galvanized layer formed on a circumference surface of a core made of copper or copper alloy and a thermal diffusion alloy layer generated between the hot-dip galvanized layer and the core, wherein
the thermal diffusion alloy layer is a layer made of a dense collection of crashed particles that integrate the core and the hot-dip galvanized layer and prevent the layer from separating from the core.

12. The electrode wire for wire electrical discharge machining according to claim 11, wherein a boundary length between the particles of the crashed thermal diffusion alloy layer and the core is at least 1.20 times longer than the length of the same electrode wire having the boundary length.

13. A method for manufacturing an electrode wire for wire electrical discharge machining, the method including: preparing a galvanized base wire to be the electrode wire by hot-dip galvanizing copper or copper alloy to produce thermal interdiffusion between a core and the hot-dip galvanized layer to form a diffusion alloy layer; and drawing the galvanized base wire, wherein
a boundary length between particles obtained by crashing the diffusion alloy and the core after wire drawing is at least 1.20 times longer than the length of the same electrode wire having the boundary length.

14. A method for manufacturing an electrode wire for wire electrical discharge machining, the method including: preparing a galvanized base wire to be the electrode wire by passing a core made of copper or copper alloy through a plating bath containing zinc at a predetermined temperature for a dipping time to form a zinc layer having a thickness exceeding a predetermined thickness as an outermost layer of the core and to form a diffusion alloy layer through thermal interdiffusion occurring at an interface where the core and the zinc are in contact, and cooling the core with the zinc layer and diffusion alloy layer; and drawing the galvanized base wire, wherein the diffusion alloy layer is crashed into particles and embedded in the circumference surface of the core to integrate the zinc thin film and diffusion alloy layer with the core and prevent the thin film from separating from the core.

15. The method for manufacturing an electrode wire for wire electrical discharge machining according to claim 14, wherein water is used as wire-drawing lubricant to increase a friction coefficient between a die and a wire material and to generate a large interface pressure in the vertical direction at an interface between the die and the wire material, and the pressure reliably crashes the diffusion alloy layer into particles that are then deeply embedded in the circumference surface of the core.

16. The method for manufacturing an electrode wire for wire electrical discharge machining according to claim 14, wherein the diffusion alloy layer is reliably crashed into particles by controlled wire drawing performed at a wire-drawing rate not lower than a predetermined wire-drawing rate to deeply embed the particles in the circumference surface of the core, and the wire-drawing rate is obtained by subtracting a cross-sectional area after wire drawing from a cross-sectional area before wire drawing to obtain a reduced cross-sectional area, dividing the reduced cross-sectional area by the cross-sectional area before wire drawing and multiplying the result by 100.

17. The method for manufacturing an electrode wire for wire electrical discharge machining according to claim 16, wherein the predetermined wire-drawing rate is 94.0% or higher.

* * * * *